A. J. SAVAGE.
VEHICLE TIRE.
APPLICATION FILED MAY 21, 1915.
1,203,910.
Patented Nov. 7, 1916.
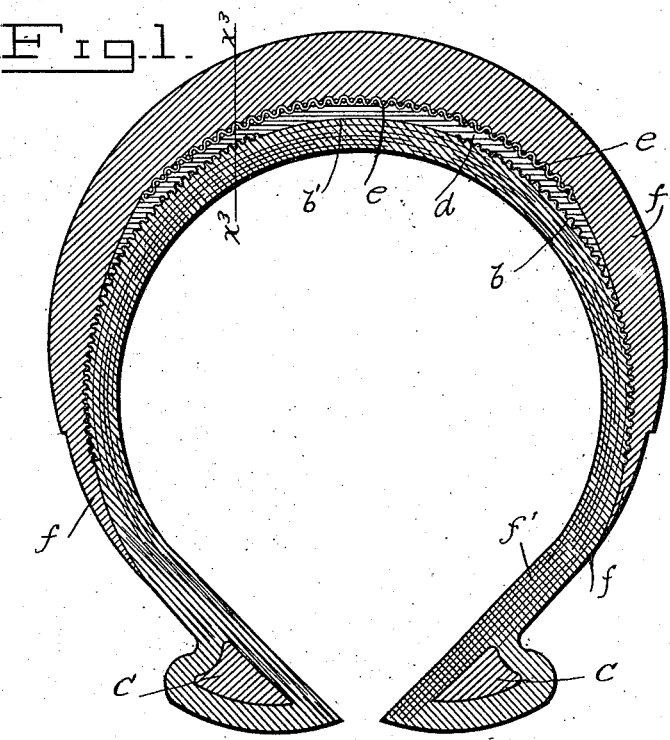
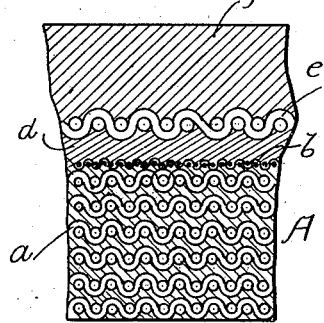
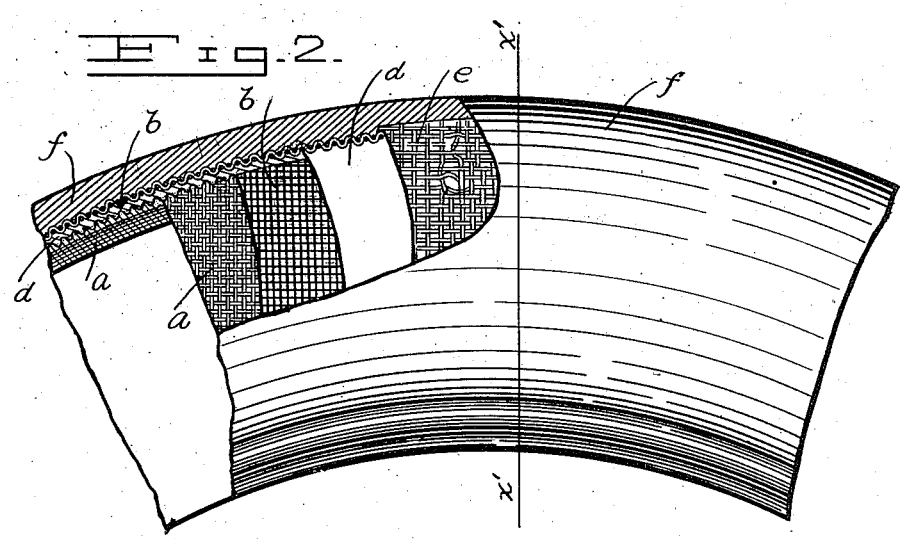
Witnesses,
H. Gearing.
Alfred H. Daehler.
Inventor,
Arthur John Savage,
by Raymond [illegible]
His Attorney.

UNITED STATES PATENT OFFICE.

ARTHUR JOHN SAVAGE, OF SAN DIEGO, CALIFORNIA, ASSIGNOR TO THE SAVAGE TIRE COMPANY, OF SAN DIEGO, CALIFORNIA, A CORPORATION OF CALIFORNIA.

VEHICLE-TIRE.

1,203,910.     Specification of Letters Patent.     Patented Nov. 7, 1916.

Application filed May 21, 1915. Serial No. 29,493.

*To all whom it may concern:*

Be it known that I, ARTHUR JOHN SAVAGE, a citizen of the United States, residing at San Diego, in the county of San Diego and State of California, have invented new and useful Improvements in Vehicle-Tires, of which the following is a specification.

This invention relates to vehicle tires, and more particularly to composite vehicle tires built up of a plurality of layers or courses of fabric, rubberized fabric, rubber, rubber substitute, or the like, all to the end that a durable and wear-and-stress-resisting tire may be provided. As is well known in this art, and particularly in the art as developed for the provision of suitable casings or tires of the pneumatic type, for automobiles and motor vehicles, such tires customarily comprise a plurality of layers or courses of rubber-impregnated textile material or fabric, with which is or are associated one or more courses or layers of rubber. It is of the utmost importance that such layers or courses be intimately united and assembled in unitary form so as to prevent breaking down or disassociation or disconnection or severing of the various composite parts of the tire. In order to accomplish superior results in this direction, I have devised a particular formation, interrelation and association of parts, members and features of tire organization, with the further particular objects in view of providing an improved tire which will be superior in point of relative simplicity and inexpensiveness of construction and organization taken in connection with the superior factors of structural stability and durability, wear-resisting quality and general efficiency and serviceability.

With the above and other objects in view, the invention consists in the novel and useful provision, formation, construction, combination, association and relative arrangement and interrelation of parts, members and features, all as hereinafter described, shown in the drawing and finally pointed out in claims.

In the drawing: Figure 1 is a transverse sectional view of an improved tire constructed and organized in accordance with the invention; Fig. 2 is a fragmentary side elevation of the same upon a diminished scale, parts being broken away for clearness and fullness of illustration, and parts being shown in section upon the line $x^2$—$x^2$, Fig. 1; and Fig. 3 is an enlarged fragmentary sectional view taken upon the line $x^3$—$x^3$, Fig. 1.

Correspondinng parts in all the figures are designated by the same reference characters.

Referring with particularity to the drawing, the improved tire constructed and organized to embody the invention comprises, considered in order progressively from the inner surface to the outer surface thereof, a plurality of layers or courses $a$ of preferably textile material or fabric impregnated with rubber, which layers or courses collectively constitute the carcass A of the tire. Applied to the outermost layer $a$ of the carcass is a layer $b$ of similar rubber-impregnated textile material, which layer is interrupted in its median portion, as at $b'$, the path of such interruption extending circumferentially with respect to the carcass of the tire and directly beneath the central or tread portion thereof. The layers or courses $a$ of the carcass A preferably extend inward to the two beads $c$ of the tire, about which beads the layers $a$ are distributed, the carcass being divided as to its layers for the reception of such beads, and the layers of the carcass being brought together and united beneath the beads, and being likewise united with the beads which consist of suitable annuli, the beads in usual practice entering into the means for securing the tire to the rim of the wheel. The layer or course $b$, however, does not extend in its two halves downward to the beads $c$, but terminates a predetermined distance outward of the same at both sides of the tire. Superposed upon the layer $b$ is a rubber cushion layer $d$, which is united or bonded with the carcass A by the layer $b$, and more effectually bonded due to the relatively finer weave or mesh of such layer $b$ when compared with the weave or mesh of the layers $a$.

In the median portion of the tire body the cushion layer $d$ directly unites with and becomes adhered to the carcass A. I have found in practice that the provision of such interrupted layer $b$, narrower *in toto* than the layers $a$ of the carcass, produces a highly efficient bond between the cushion layers $d$ and the carcass, effectually preventing severance as between the cushion and the carcass; and that such uniting is more positive and effectual than when such layer $b$ is omitted. I further superpose upon the cushion layer *d* what is known in the art as a breaker strip or layer *e*, which is relatively narrower than the bonding strip *b*, and overlies the zone of interruption of the bonding strip *b*; the same consisting of rubber-impregnated textile material of very coarse weave or mesh, even coarser in these respects than the layers *a* of the carcass. Upon this breaker strip *e* is superposed the usual tread layer or course *f* of rubber, which overlies such breaker strip, the cushion *d*, the bonding layer *b* and the layers of the carcass, ranging down over the side portions of the tire in diminishing thickness, and merging into the side walls *f'* which continue inward to the beads *c*.

The breaker strip or layer *e* effectively unites or bonds the tread *f* with the cushion layer *d*; and as the cushion layer *d* is effectively bonded with the carcass A by the layer *b*, all of the structural elements of the tire body are positively inter-connected and associated together, and united with the beads *c*, the resultant tire possessing a high degree of inherent stability and durability, and being capable of withstanding excessive strain and stress tending otherwise to disrupt the organization of the tire.

It is manifest that changes may be made in practising of the invention, with respect to the specific disclosures of the foregoing description and of the drawing, in adapting the invention to varying conditions of use and service and within a fair range of preference, without departing from the spirit of the invention and a fair interpretation thereof.

Having thus disclosed my invention, I claim and desire to secure by Letters Patent:

1. An improved built-up tire, comprising a built-up woven fabric carcass with its beads, a layer of woven fabric applied over the carcass, a cushion layer applied over said fabric layer, and a tread applied over said cushion layer; said applied fabric layer being of finer weave than the fabric of said carcass.

2. An improved built-up tire, comprising a built-up woven fabric carcass with its beads, a layer of woven fabric applied over the carcass, a cushion layer applied over said fabric layer, and a tread applied over said cushion layer; said applied fabric layer being of finer weave than the fabric of said carcass; there being a breaker strip between said cushion layer and the tread.

3. An improved built-up tire, comprising a carcass with its beads, a relatively fine layer of woven fabric applied over the carcass, a cushion layer applied over said fabric layer, and a tread applied over said cushion layer; said fabric layer being interrupted to provide two spaced portions extending circumferentially of the tire.

4. An improved built-up tire, comprising a carcass with its beads, a relatively fine layer of woven fabric applied over the carcass, a cushion layer applied over said fabric layer, and a tread applied over said cushion layer; said fabric layer being interrupted to provide two spaced portions extending circumferentially of the tire, the carcass of the tire comprising a plurality of superposed fabric layers, the weave of which is coarser than that of said first named fabric layer.

5. An improved built-up tire, comprising a carcass provided with beads, a bonding strip of fabric of relatively fine weave applied over the carcass and interrupted in its median portion circumferentially of the tire, a cushion layer applied over said fabric layer, a breaker strip applied over said cushion layer, and a tread applied over said breaker strip; said fabric layer providing a bond between the carcass and the cushion layer, and the breaker strip providing a bond between the cushion layer and the tread.

6. In an improved built-up tire, a carcass comprising a plurality of superposed courses of rubber-impregnated fabric, a rubber tire element applied to the carcass, and a fabric bond interposed between the carcass and the rubber tire element and being of a finer fabric weave than the layers of the carcass.

7. In an improved built-up tire, a carcass comprising a plurality of superposed courses of rubber-impregnated fabric, a rubber tire element applied to the carcass, and a fabric bond interposed between the carcass and the rubber tire element and being of a finer fabric weave than the layers of the carcass; said fabric bond being interrupted to provide spaced portions thereof extending circumferentially of the tire.

In testimony whereof I have signed my name to this specification in the presence of two subscribing witnesses.

ARTHUR JOHN SAVAGE.

Witnesses:
WILLIAM BUDD KELLEY,
HAROLD W. DILL.